United States Patent [19]

Lai

[11] 4,225,849
[45] Sep. 30, 1980

[54] N-BIT MAGNITUDE COMPARATOR OF FREE DESIGN

[75] Inventor: Hung C. Lai, Cupertino, Calif.

[73] Assignee: Fujitsu Limited, Japan

[21] Appl. No.: 901,412

[22] Filed: May 1, 1978

[51] Int. Cl.$^3$ .............................................. G06F 7/04
[52] U.S. Cl. .................................................. 340/146.2
[58] Field of Search ................... 340/146.2; 364/146.2

[56] References Cited

U.S. PATENT DOCUMENTS

| | | | |
|---|---|---|---|
| 3,218,609 | 11/1965 | Shaw | 340/146.2 |
| 3,390,378 | 6/1968 | Dryden | 340/146.2 |
| 3,656,109 | 4/1972 | Conway | 340/146.2 |
| 3,938,087 | 2/1976 | Louie | 340/146.2 |

OTHER PUBLICATIONS

Kennedy et al., "No-Ripple, Parallel, High-Low-Equal Comparator" *IBM Tech. Disclosure Bulletin vol. 8 No. 3. Aug. 1965, pp. 407-408.*

*Primary Examiner*—David H. Malzahn
*Attorney, Agent, or Firm*—Thomas E. Schatzel

[57] ABSTRACT

An N-bit magnitude comparator of tree design having a plurality of one-bit magnitude comparators connected to a cascading network with a first stage adapted to receive signals from each pair of the one-bit magnitude comparators and subsequent stages for receiving signals from the preceding stage in the cascade network. The first and every alternate stage thereafter in the cascading circuit comprises means for inverting the signal polarity to the input of that stage so as to achieve one gate delay per circuit.

10 Claims, 11 Drawing Figures

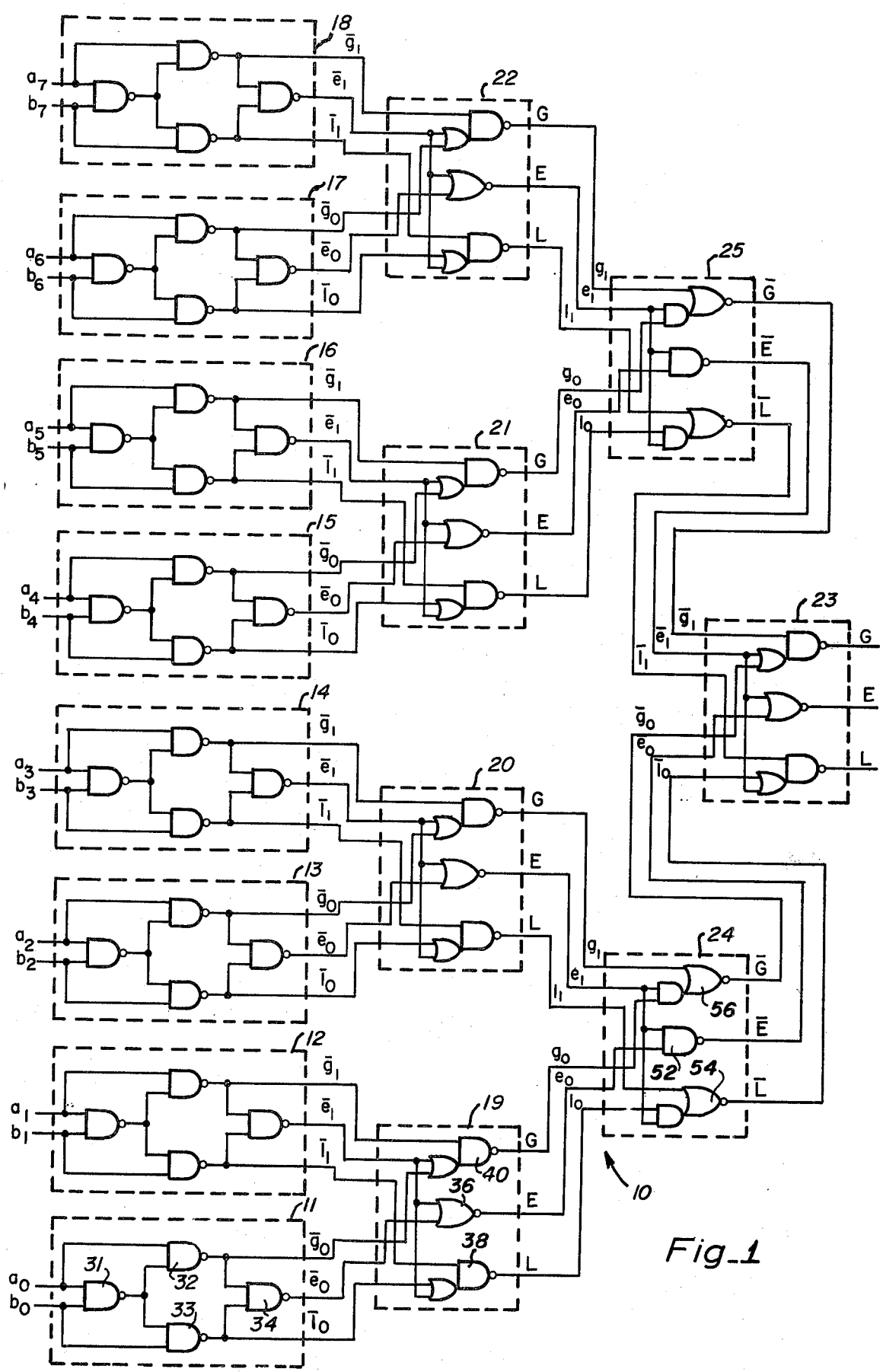
Fig_1

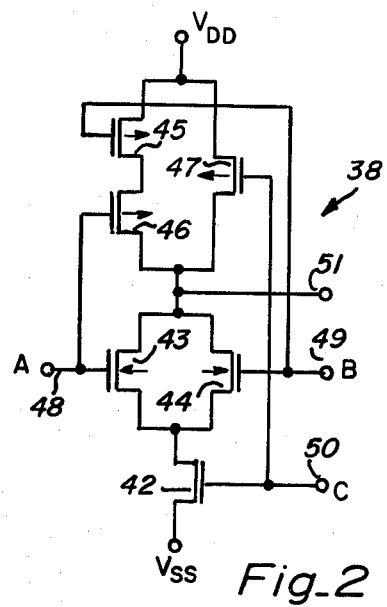
Fig_2
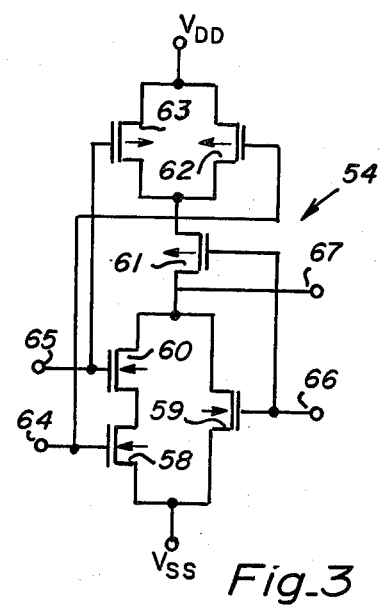
Fig_3
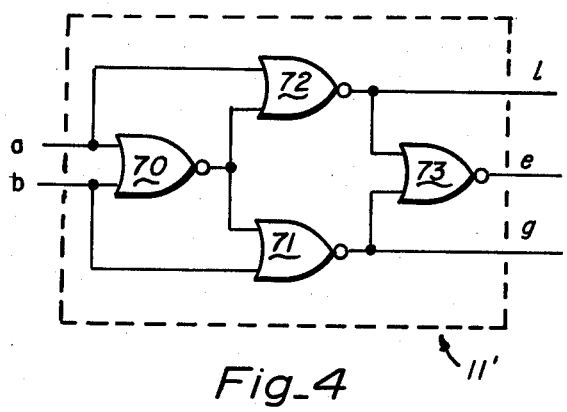
Fig_4
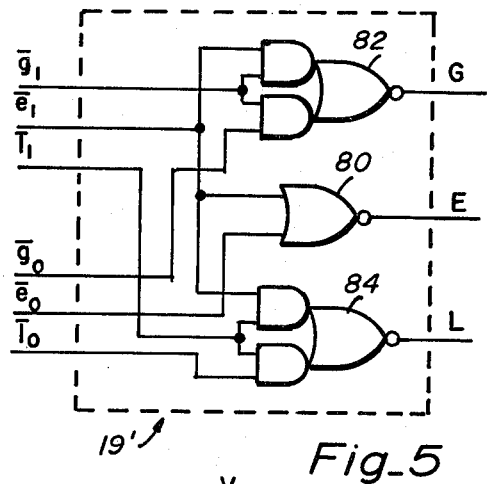
Fig_5
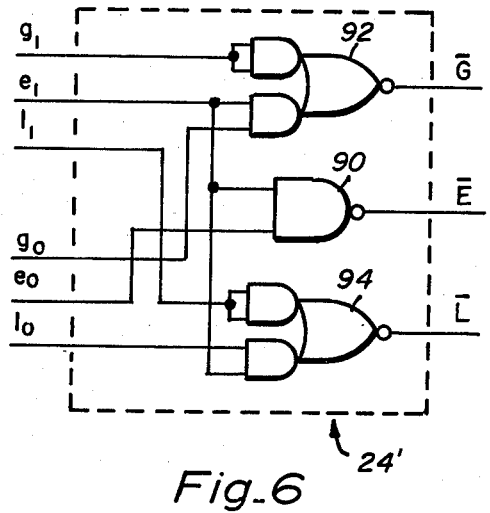
Fig_6
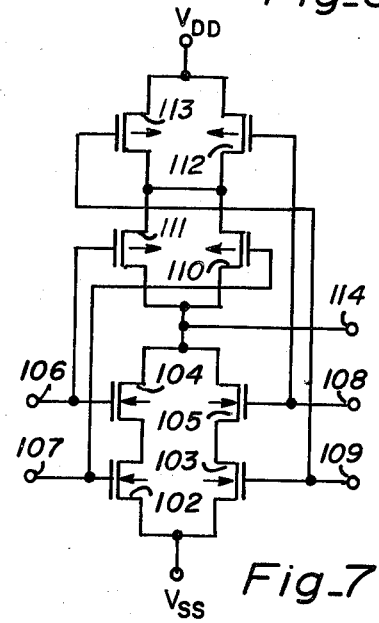
Fig_7

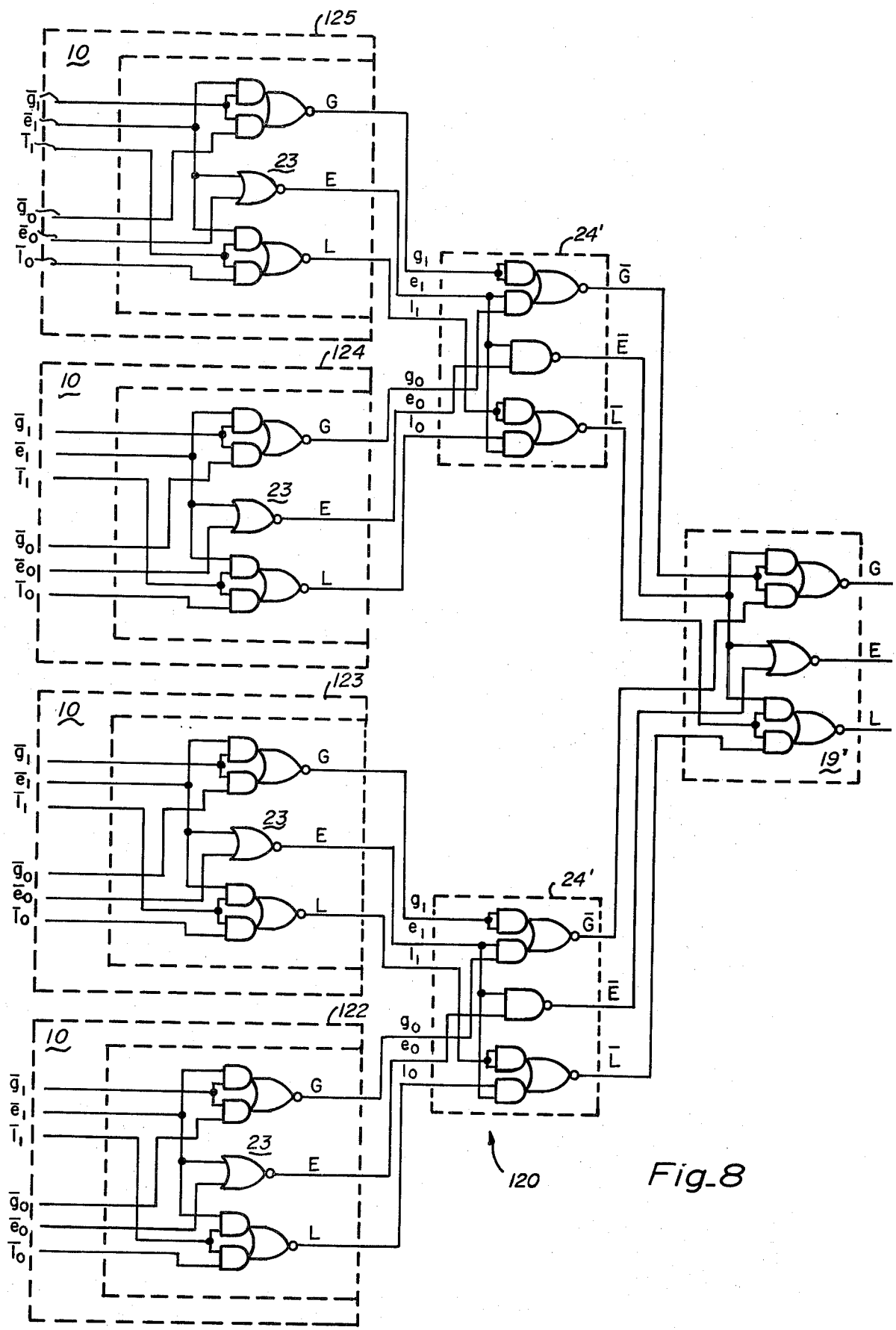
Fig_8

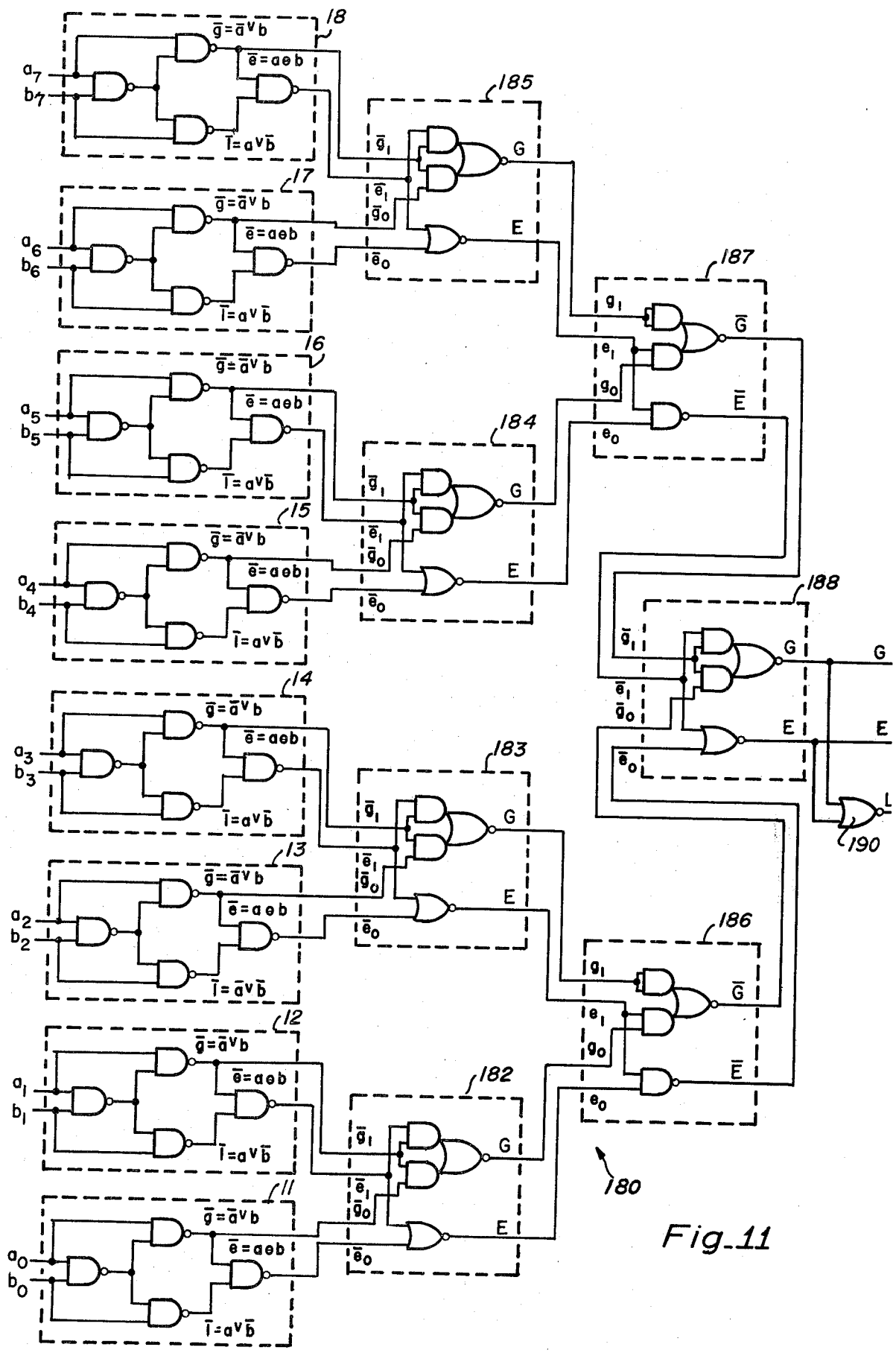
Fig_11

N-BIT MAGNITUDE COMPARATOR OF FREE DESIGN

BACKGROUND OF THE INVENTION

1. Field of the Invention

This invention relates to a magnitude comparator and more specifically to a tree-type magnitude comparator with decreased number of gate delays.

2. Description of the Prior Art

The prior art includes magnitude comparators capable of comparing two binary words A and B and indicating whether the magnitude of word A is greater than that of word B, equal to that of word B or less than that of word B. Magnitude comparators of conventional design commonly use a sort of "look-ahead" scheme. For example, types SN5485, SN54L85, SN54LS85, SN54S85, SN7485, SN74L85, SN74LS85 and SN74S85 offered by Texas Instruments, Dallas, Tex., incorporate the conventional design. Though it is well known that the "look-ahead" scheme can provide high speed circuitry, it requires a relatively large number of logic circuits and complex interconnections.

SUMMARY OF THE PRESENT INVENTION

It is therefore a principal object of the present invention to provide a simplified magnitude comparator.

It is another object to provide a magnitude comparator with a decreased number of gate delays.

Another object is to provide a magnitude comparator of a tree design.

Another object is to provide a magnitude comparator capable of receiving a large number of input bits.

A further object is to provide a magnitude comparator with a plurality of cascading circuit stages with each cascading circuit stage adapted to alternate the polarity of the output from that of the input signal. Briefly, a preferred embodiment of the present invention is a magnitude comparator of tree design including a plurality of one-bit magnitude comparators. Signals of each bit to be compared are applied to the input of the one-bit magnitude comparators. Each one-bit magnitude comparator provides an output of a first polarity indicative of the relative magnitude of the input bits. A first stage of circuits of a cascading network is connected to the one-bit magnitude comparators with the output of two one-bit magnitude comparators connected to the input of one cascading circuit of the first stage of the cascading network. Each cascading circuit of the first stage compares the received outputs from the connected two one-bit magnitude comparators and provides corresponding output signals of a second polarity, which is the inverse of the first polarity. The alternation of the polarity of the output signals allows for simplified circuits in such a way that the cascade circuit network may comprise one gate delay circuitry.

The alternation of the polarity of the output signals is continuously executed in following stages of the cascade network. A second stage of the cascading network is built on the cascading circuits of the first stage in a tree design such that the outputs of two adjacent cascading circuits of the first stage are connected to a single cascading circuit of the second stage. The cascading circuits of the second stage compare the received inverted polarity signals and generate corresponding outputs of the first polarity.

A third stage of cascading circuits is connected to the cascading circuits of the second stage such that the outputs of two adjacent cascading circuits of the second stage are connected to a single cascading circuit of the third stage. The cascading circuit of the third stage compares the received signals and generates corresponding outputs of the second polarity.

Additional stages of cascading circuits will be provided depending on the number of bit signals in the input to the one-bit comparators.

With the circuitry of the present invention, a magnitude comparator may be built wherein the outputs in the intermediate stages of cascading circuits requires only two outputs and the missing output in the final stage is created using the two outputs in the final stage thereby decreasing the number of gates.

Also, common logic gates may be used in each cascading circuit of the stages so that it is not necessary that logic gates of many different configurations be used.

Furthermore, the magnitude comparator of tree design is created with decreased number of gate delays so that high speed comparison is achieved.

These and other objects and advantages of the present invention will no doubt become apparent after having read the following detailed description of the preferred embodiments which are illustrated in the several figures of the drawing.

IN THE DRAWING

FIG. 1 is a functional block diagram of an eight-bit magnitude comparator of the present invention;

FIG. 2 is a circuit diagram of an OR-AND-INVERTER gate of a type I cascading circuit of FIG. 1 and using CMOS transistors;

FIG. 3 is a circuit diagram of an AND-OR-INVERTER gate using CMOS transistors;

FIG. 4 is a circuit diagram of an alternative one-bit comparator of the comparator of FIG. 1;

FIG. 5 is a circuit diagram of an alternative cascading circuit of the comparator of FIG. 1;

FIG. 6 is a circuit diagram of an alternative cascading circuit of the comparator of FIG. 1;

FIG. 7 is a circuit diagram of an alternative embodiment of a gate of a cascading circuit for the comparator of the present invention;

FIG. 8 is a functional block diagram of a 32-bit magnitude comparator of the present invention;

FIG. 11 is a functional block diagram of an eight-bit magnitude comparator of the present invention.

DETAILED DESCRIPTION OF THE PREFERRED EMBODIMENT

Figure 9:
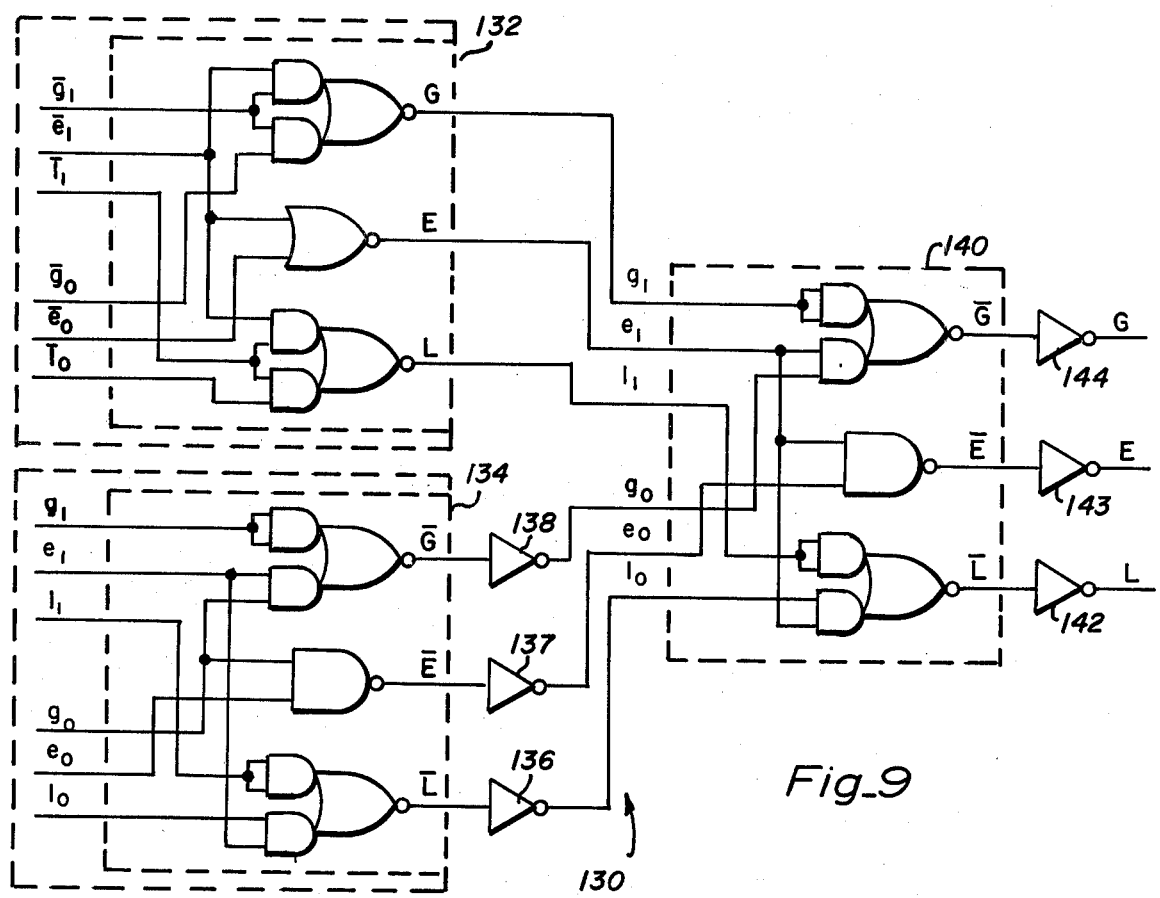
FIG. 9 is a functional block diagram of a 12-bit magnitude comparator of the present invention.

FIG. 1 is a functional block diagram of an 8-bit magnitude comparator stage referred to by the general reference character stage 10 and incorporating the present invention. The comparator stage 10 is adapted to receive two binary words A and B comprising bits $a_0$ through $a_7$ $$(A = \sum_{i=0}^{7} a_i 2^i)$$

and $b_0$ through $b_7$ $$(B = \sum_{i=0}^{7} b_i 2^i),$$

respectively, wherein "i" represents the order of the bit. The comparator stage 10 produces one of three outputs G, E or L indicating whether A is greater than B (A>B), A is equal to B (A=B) or A is less than B (A<B), respectively.

The comparator stage 10 includes eight one-bit comparator circuits 11–18, five Type I cascading circuits 19–23, and two Type II cascading circuits 24 and 25. The comparator circuits 11–18 provide the comparator stage 10, the cascade circuits 19–22 provide a first cascade stage, the cascade circuits 24 and 25 provide a second cascade stage and the circuit 23 provides a third cascade stage. As shown in FIG. 1, the stages are connected in a tree configuration with comparators 11 and 12 of the comparator stage connected to cascade circuit 19 of the first cascade stage; one-bit comparators 13 and 14 of the comparator stage connected to the input of cascade circuit 20 of the first cascade stage; one-bit comparators 15 and 16 of the comparator stage connected to the input of cascade circuit 21 of the first cascade stage; one-bit comparators 17 and 18 of the comparator stage connected to the input of cascade circuit 22 of the first cascade stage; cascade circuits 19 and 20 of the first cascade stage are connected to the input of cascade circuit 24 of the second cascade stage; cascade circuits 21 and 22 of the first cascade stage are connected to the input of cascade circuit 25 of the second cascade stage; and cascade circuits 24 and 25 are connected to the input of the cascade circuit 23 which comprises the third and final cascade stage.

Each of the one-bit comparators 11–18 comprises four NAND gates 31–34. These gates may be bipolar or MOS devices including complementary MOS (CMOS). Each of the one-bit comparators 11–18 receives a bit of each of the binary words A and B, and generates outputs $\bar{g}$, $\bar{e}$ and $\bar{l}$ responsive to the comparative magnitude of the input bits. The signals $\bar{g}$, $\bar{e}$ and $\bar{l}$ are inverted signals of said G, E and L, respectively.

Assuming that the arbitrary input bits are $a_i$ and $b_i$, wherein "i" represents the order of the bit the outputs $g_i$, $e_i$ and $l_i$ may be basically expressed as follows:

$$g_i = a_i \bar{b}_i,$$

$$e_i = \overline{a_i \oplus b_i},$$

and $$l_i = \bar{a}_i b_i.$$

These equations can be transformed as follows:

$$\bar{g}_i = \overline{a_i \bar{a}_i b_i} = \bar{a}_i V b_i$$

$$\bar{e}_i = a_i \oplus b_i,$$

and $$\bar{l} = \overline{\overline{a_i \bar{b}_i} \cdot b_i} = a_i V \bar{b}_i.$$

The inverted outputs $\bar{g}_i$, $\bar{e}_i$, and $\bar{l}_i$ permit the whole circuit to be simplified over conventional designs. For example, it should be noted that three more inverters would be required to get normal outputs $g_i$, $e_i$ and $l_i$ according to the conventional design.

The Type I cascading circuits 19–22 each comprise one NOR gate 36 and two OR-AND-INVERTER gates 38 and 40 having one gate delay as the whole. FIG. 2 is a circuit diagram of the OR-AND-INVERTER gates 38 and 40 using CMOS transistors and providing the one gate delay. The gates 38 and 40 of FIG. 2 each include three N-channel transistors 42, 43 and 44, and three P-channel transistors 45, 46 and 47. The three N-channel transistors 42–44 are off when the gate inputs on terminals 48–50 are low while the three P-channel transistors 45–47 are conductive when the gate inputs are low. A voltage source $V_{DD}$ is connected to the P-channel transistors 45 and 47 for providing a high level output at a terminal 51. A voltage source $V_{SS}$, normally ground, is connected to the N-channel transistor 42 for providing a low level output at the terminal 51.

For purposes of explanation of the comparator 10, let $\bar{g}_1$, $\bar{e}_1$ and $\bar{l}_1$ and $\bar{g}_0$, $\bar{e}_0$ and $\bar{l}_0$ be the outputs of the two one-bit magnitude comparators 11 and 12, respectively. The comparators 11 and 12 receive the significant bits $a_0$ and $b_0$, and the more significant bits $a_1$ and $B_1$, respectively.

The comparators 13 and 14 receive the bits $a_2$ and $b_2$, and the more significant bits $a_3$ and $b_3$, respectively; the comparators 15 and 16 receive the bits $a_4$ and $b_4$, and the more significant bits $a_5$ and $b_5$, respectively; and the comparators 17 and 18 receive the bits $a_6$ and $b_6$, and the more significant bits $a_7$ and $b_7$, respectively. The output of each of the comparators 11, 13, 15 and 17 is $\bar{g}_0$, $\bar{e}_0$ and $\bar{l}_0$. The output of each of the comparators 12, 14, 16 and 18 is $\bar{g}_1$, $\bar{e}_1$ and $\bar{l}_1$. Thus, each of the cascade circuits 19–22 receive $\bar{g}_1$, $\bar{e}_1$ and $\bar{l}_1$ signals and $\bar{g}_0$, $\bar{e}_0$ and $\bar{l}_0$ signals.

The outputs of each of circuits 19–22 is written as follows:

$$G = \overline{\bar{g}_1(\bar{e}_1 V \bar{g}_0)} = g_1 V e_1 g_0 [a_1 > b_1 \text{ or } (a_1 = b_1 \text{ and } a_0 > b_0)], \quad (1)$$

$$E = \overline{\bar{e}_1 V \bar{e}_0} = e_1 e_0 (a_1 = b_1 \text{ and } a_0 = b_0), \text{ and} \quad (2)$$

$$L = \overline{\bar{e}_1(\bar{e}_1 V \bar{l}_0)} = e_1 V e_1 l_0 [a_1 < b_1 \text{ or } (a_1 = b_1 \text{ and } a_0 < b_0)]. \quad (3)$$

These equations mean that the required outputs G, E and L are expressed by the inverted outputs $\bar{g}_1$, $\bar{e}_1$, $\bar{l}_1$ and $\bar{g}_0$, $\bar{e}_0$, $\bar{l}_0$ and the one gate delay is available using negative gates only. The cascade circuits 24 and 25 of Type II then invert the signals to provide $\overline{G}$, $\overline{E}$ and $\overline{L}$ signals. The Type I circuit 23 then generates G, E and L signals. Thus, two-bit comparison is accomplished by each of the comparators 19–22 in stage 1. If only two-bit comparison were desired, the two magnitude comparators 11 and 12 in combination with the cascade circuit 19 would only be necessary. To realize four-bit comparison, four magnitude comparators 11–14, two cascade circuits 19 and 20, and the second stage cascade circuit of Type II is needed (the output, however, will be the inverse $\overline{G}$, $\overline{E}$ and $\overline{L}$). To realize eight-bit comparators, eight magnitude comparators, four first stage cascade circuits, two second stage circuits and one third stage cascade circuit is needed.

The cascading circuits 24 and 25 of the second stage, as shown, in FIG. 1 comprise one NAND gate 52 and two AND-OR-INVERTER gates 54 and 56. Each circuit 24 and 25 provides one gate delay as a whole.

FIG. 3 is a circuit diagram using CMOS of the AND-OR-INVERTER gates 54 and 56. The gates 54 and 56 each comprise three N-channel transistors 58–60 and three P-channel transistors 61–63. There are three input terminals 64, 65 and 66, and one output terminal 67. The three transistors 58–60 are off when the gate inputs on terminals 64, 65 and 66 are low while the three transistors 61–63 are conductive when the gate inputs are low. A voltage source $V_{DD}$ is connected to the P-channel transistors 62 and 63 for providing the high level output at a terminal 67. A voltage source $V_{SS}$, normally ground, is connected to the N-channel transistors 58 and 59 for providing the low level output at the terminal 67.

For purposes of explanation of the gates 54 and 56, assume $g_1$, $e_1$ and $l_1$, and $g_0$, $e_0$ and $l_0$ are the outputs of two circuits 19 and 20 of the first stage with input to the gate 54 being $e_1$, $l_0$, $l_1$, the input to gate 56 being $e_1$, $g_0$ and $g_1$ and the input to NAND gate 52 being $e_0$ and $e_1$. The combined outputs of the circuit 24 can then be represented as $$\overline{G} = \overline{g_1 V e_1 g_0} = \overline{g_1(\overline{e_1} V g_0)} = \overline{g_1 e_1} V \overline{g_1 g_0}[a_1 > b_1 \text{ and } a_1 \neq b_1; \text{ or } a_1 > b_1 \text{ and } a_0 > b_0. \text{ This implies } a_1 a_0 > b_1 b_0] \quad (4),$$

$$\overline{E} = \overline{e_1 e_0} = \overline{e_1} V \overline{e_0}[a_1 \neq b_1 \text{ or } a_0 \neq b_0. \text{ This implies } a_1 a_0 \neq b_1 b_0] \text{ and} \quad (5),$$

$$\overline{L} = \overline{l_1 V e_1 l_0} = \overline{l_1(\overline{e_1} V l_0)} = \overline{l_1 e_1} V \overline{l_1 l_0}[a_1 < b_1 \text{ and } a_1 \neq b_1; \text{ or } a_1 < b_1 \text{ and } a_0 < b_0. \text{ This implies } a_1 a_0 < b_1 b_0]. \quad (6)$$

When a four-bit comparator is required at this stage, three inverters are used to invert the outputs $\overline{G}$, $\overline{E}$ and $\overline{L}$ respectively. However, for an overall eight-bit magnitude comparator, the inverted outputs $\overline{G}$, $\overline{E}$ and $\overline{L}$ of the second cascade circuit are convenient for the next cascade stage. The third stage is supplied with a pair of the inverted outputs $\overline{G}$, $\overline{E}$, $\overline{L}$, and therefore the internal circuit of the circuit 23 is coincident with the aforesaid cascading circuits 19–22 of Type I.

Thus, the eight-bit comparator 10 is comprised of eight one-bit comparators 11 to 18, five cascading circuits 19–23 of Type I, and two cascading circuits 24 and 25 of Type II. Each circuit block is built in the tree configuration. It is also seen that each circuit block outputs the inverted signal of polarity with respect to the supplied input thereby allowing each cascading circuit to be constructed in the one gate delay thus allowing for simplified circuitry. The eight-bit comparator has six gates delay as the whole.

Again referring to the one-bit comparators 11–18, an alternative embodiment is illustrated in FIG. 4. As illustrated in FIG. 4, each one-bit comparator 11–18 may comprise four NOR gates 70–73. The two bits to be compared are received at the input of the gate 70 and the outputs g, l and e at the output of gates 71, 72 and 73.

The cascading circuits 19–23 of Type I may assume an alternative design as shown in FIG. 5 in detail and referred to as 19'. The circuit 19' includes a NOR gate 80 and two AND-OR-INVERTER gates 82 and 84.

The cascading circuit of Type II has also an alternative which is shown in FIG. 6 and referred to as 24'. The circuit 24' includes a NAND gate 90 and two AND-OR-INVERTER gates 92 and 94.

It should now be apparent from the foregoing that the cascading circuits of both Types I and II comprise a pair of two-input, two-wide AND-OR-INVERTERs. FIG. 7 is a circuit diagram of the two-input, two-wide AND-OR-INVERTER gate using CMOS transistors.

There are four N-channel transistors 102–105 which are off when the gate inputs on input terminals 106–109 are low and four P-channel transistors 110–113 which are conductive when the gate inputs ae low. The voltage source $V_{DD}$ is connected to the P-channel transistors for providing the high level output at an output terminal 114. The voltage source $V_{SS}$, normally ground, is connected to the N-channel transistor for providing the low level output at the terminal 114.

FIG. 8 is a functional block diagram of a 32-bit magnitude comparator referred to by the general reference character 120 and incorporating the present invention. The comparator 120 includes four blocks 122–125, each of which comprises the eight-bit comparator 10 shown in FIG. 1. However, to avoid redundancy only the last stage 23 of the circuit 10 is shown in each block 122–125. Two Type II cascading circuits 24' are connected to the four eight-bit comparators 112–115. The last stage is a Type I cascading circuit 19'. The 32-bit magnitude comparator 120 thus obtained requires only eight gate delays.

An n-bit magnitude comparator may be constructed by cascading a $(2^{k-1})$-bit comparator with a $(n-2^{k-1})$-bit comparator to minimize the total number of inverters to be added wherein "k" is the smallest interger not smaller than "$\log_2 n$." Furthermore, it may be advantageous to add inverters to the outputs of the longer comparator in order to obtain the desired polarity of the entire comparator and yet not increase the total number of gate delay. For example, consider a twelve-bit magnitude comparator. Such a comparator can be constructed by cascading an eight-bit comparator and a four-bit comparator in either of two ways. FIG. 9 shows a functional block diagram of the twelve-bit magnitude comparator, referred to by the general reference character 130. The comparator 130 includes an eight-bit comparator 132, a four-bit comparator 134. The outputs of the eight-bit magnitude comparator 132 are connected to a Type II cascading circuit. The outputs of the four-bit magnitude comparator 134 are inverted by three inverters 136–138 respectively and the inverted signals are supplied to a Type II cascading circuit 140. The four-bit magnitude comparator 134 is illustrated as including the last stage of a four-bit comparator for simplicity of explanation. The circuit 140 outputs inverted signals G, E and L so that a set of inverters 142–144 are provided for matching the polarity. Thus, to accommodate a twelve-bit magnitude comparator, two sets of inverters are incorporated in combination with Type I and Type II cascading circuits.

Figure 10:
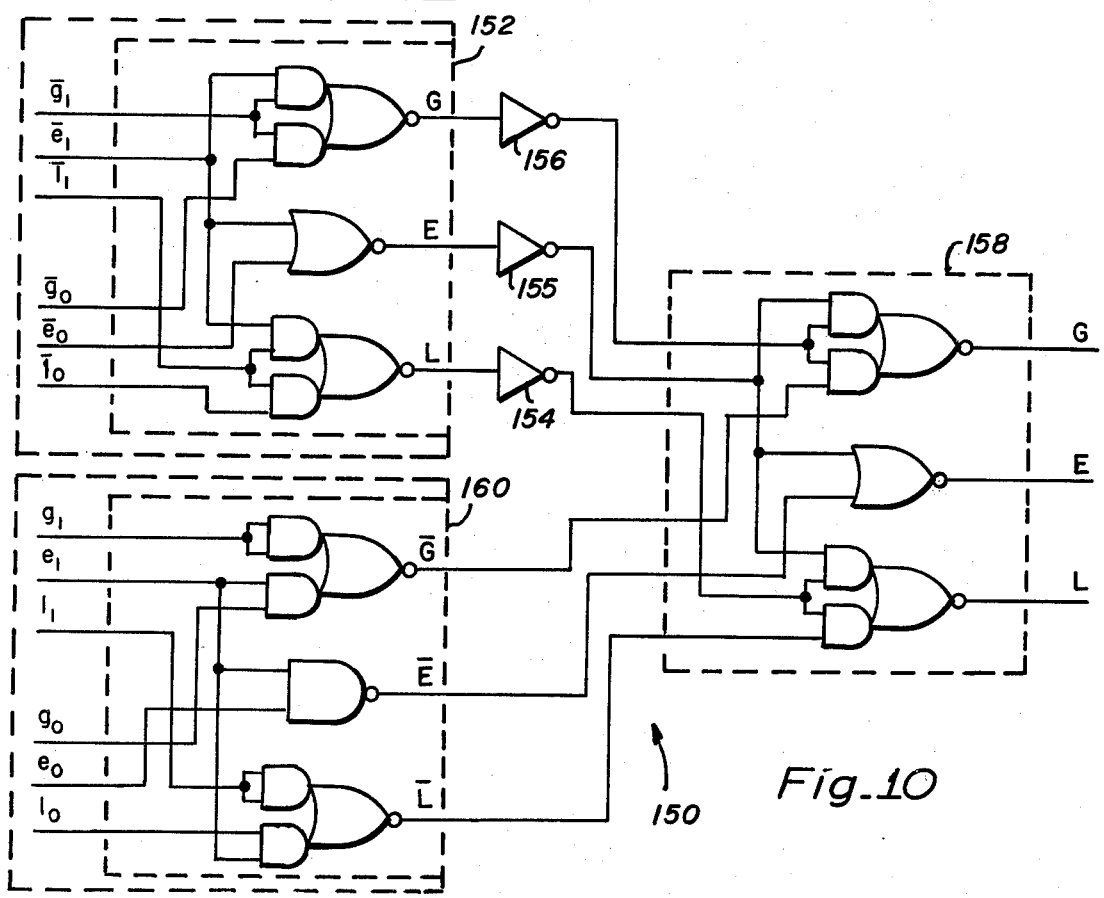
FIG. 10 is a functional block diagram of an alternative embodiment of a 12-bit magnitude comparator of the present invention.

FIG. 10 illustrates another twelve-bit magnitude comparator referred to by the general reference character 150, and incorporating the present invention. The comparator 150 only requires one set of inverters. The outputs from an eight-bit comparator 152 are inverted by a set of inverters 154–156, then supplied to a Type I cascading circuit 158. The outputs of a four-bit magnitude comparator 160 are connected to the cascading circuit 158.

Further explanation of the believed theory of operation of magnitude comparators of the present invention is as follows. As will be seen from the equations (1), (2), (3), (4), (5), and (6), the output G is a function of $g_1$, $g_0$ and $e_1$ only; and the output L is a function of $l_1$, $l_0$ and $e_1$ only. Therefore, eliminating the gate for either $G(\overline{G})$ or $L(\overline{L})$ from each cascading circuit does not affect the other two outputs of the entire comparator. Furthermore, since the G, E and L are mutually exclusive, the eliminated output can be easily obtained at the final stage from the other two outputs as follows:

$$G = \overline{E V L} = \overline{E} \, \overline{L}$$

$$L = \overline{EVG} = \overline{EG}$$

This results in an addition of one level of gate delay for the missing output, but the reduction of the fan-outs for e, from three to two, in the intermediate stages may compensate for such an increase, especially in the case of MOS.

FIG. 11 shows a functional block diagram of an eight-bit magnitude comparator, referred to by the general reference character 180, with cascading circuits of reduced fan-outs. In FIG. 11, one-bit comparators 11–18, the same as in the embodiment 10 of FIG. 1, are incorporated. The next stage is comprised of four Type I cascading circuits 182–185 which coincide in part with the Type I cascading circuits shown in FIG. 8. The following stage of the circuit 180 comprises two Type II cascading circuits 186 and 187 and which coincide in part with the Type II cascading circuits shown in FIG. 8. The final stage of the circuit 180 comprises a Type I cascading circuit 188 similar to the circuits 182–185. The Type I cascading circuits 182–185 and 188, and the Type II circuits 186 and 187 have no logic gates for the signal L. Instead, a signal NOR gate 190 is adapted for creating the missing output L. The longest gate delay for the output L is seven gate units.

In general, a $(2^{2k+1})$-bit magnitude comparator with two outputs can be constructed with:
$[2^{2k+3} + 2(2^{2k}-1)/3]$ two-input NAND gates,
$(2^{2k+2}-1)/3$ two-input NOR gates, and
$(2^{2k+1}-1)$ AND-OR-INVERTER gates,
which will have $2(k+2)$ levels of gate delay.

Similarly, a $2^{2k}$-bit magnitude comparator can be constructed with:
$2^{2k+2} + (2^{2k}-1)/3$ two-input NAND gates,
$2(2^{2k}-1)/3$ two-input NOR gates,
$2^{2k}-1$ AND-OR-INVERTER gates, and
2 inverters for the required polarity
of the outputs, which will have $2(k+2)$ levels of gate delay.

When "n" is not a power of "2," or when all three outputs are required, the total number of gates to be required and the total number of gate delay can also be easily obtained.

The aforesaid embodiments are comprised of the one-bit magnitude comparators generating inverted polarity of output signals $\bar{g}$ and $\bar{e}$. When NOR-gate circuits are to be used as the one-bit magnitude comparators, it is required to simply exchange the type of cascading circuits without changing the tree formation and accompanying gate delay.

It may also be noted that the NOR gate circuit 11′ shown in FIG. 4 directly provides the normal polarity of signals g, e and l so that it is required that the next stage of the cascading circuits are of Type II, and the next higher stage of the cascading circuits are of Type I.

While, for the sake of clearness and in order to disclose the invention so that the same can be readily understood, specific embodiments have been described and illustrated, it is to be understood that the present invention is not limited to the specific means disclosed. It may be embodied in other ways that will suggest themselves to persons skilled in the art. It is believed that this invention is new and that all such changes that come with the scope of the following claims are to be considered as part of this invention.

What is claimed is:

1. An N-bit magnitude comparator of tree design comprising:
   a magnitude comparator stage for receiving a pair of binary words each binary word comprised of "N" bits, the magnitude comparator state including "N" one-bit magnitude comparator circuits, each of said one-bit magnitude comparator circuits adapted to receive a bit of the same order of each binary word and providing one of three distinct output signals indicative of which of the input bits of the binary words is largest in magnitude or whether the input bits of the binary words are of equal magnitude; and
   a first cascade stage comprising N/2 individual cascading circuits with each of said individual cascading circuits connected to receive the output of two of said one-bit magnitude comparator circuits, each of said individual cascading circuits having one-gate delay and providing output signals indicative of which of the output signals from the associated one-bit magnitude comparators is largest in magnitude or whether the input signals are of equal magnitude, the relative polarity of the output being inverted relative to the polarity of the output of the magnitude comparators.

2. The magnitude comparator of claim 1, wherein each of said one-bit magnitude comparator circuits of the magnitude comparator stage is comprised of four NAND gates.

3. The magnitude comparator of claim 1, wherein each of said one-bit magnitude comparator circuits of the magnitude comparator stage is comprised of four NOR gates.

4. The magnitude comparator of claim 1, wherein said cascading circuits comprise two OR-AND-INVERTER gates and a NOR gate.

5. The magnitude comparator of claim 1, wherein said cascading circuits comprise two AND-OR-INVERTER gates and a NOR gate.

6. The magnitude comparator of claim 1, further comprising,
   a second cascade stage circuit comprising a plurality of individual cascading circuits for connecting two individual cascading circuits of the first cascade stage and receiving the output signals from two individual circuits of the first cascade stage, each of said individual second cascade stage circuits having one-gate delay and providing output signal indicative of which of the output signals from the associated individual circuits of the first cascade stage is largest in magnitude or of equal value, the relative polarity of the output being of the same polarity as the output of the associated magnitude comparators of the magnitude comparator stage.

7. The magnitude comparator of claim 6, further comprising,
   at least two inverters connected to individual cascading circuits of said second cascade stage thereby providing output signals of inverted polarity from the polarity of the output of the associated magnitude comparators of the magnitude comparator stage.

8. The magnitude comparator of claim 6, further comprising,
   a third stage cascading circuit connected to and receiving the output of two individual second stage cascading circuits, said third stage cascading circuit being of one gate delay and providing output signals the relative polarity of which is inverted from the polarity of the associated magnitude comparators of the output of the magnitude comparator stage.

9. The magnitude comparator of claim 8, further comprising,
at least two inverters connected to the outputs of one of said individual circuits of the third stage cascading circuit;
a following cascading circuit connected to the output of said inverters, said following cascading circuit being of one gate delay and providing output signals of polarity similar to the polarity of the input signals of the associated inverters; and
another following cascading circuit being connected to said following cascading circuit with a one gate delay circuit and providing an output signal of said second plurality.

10. An N-bit magnitude comparator of tree design comprising:
means for receiving two sets of N-bit binary input signals wherein N is a whole number;
a one-bit comparator stage including N sets of one-bit comparator circuits with each one-bit comparator circuit adapted for receiving a pair of equal significant bit signals of the binary input;
a first stage of individual cascading circuits with each individual cascading circuit connected to two sets of one-bit magnitude comparator circuits, each of said individual cascading circuits of said first stage including a two-input, two-wide AND-OR-INVERTER gate and a NOR gate;
a second stage of cascading circuits for connecting with each of two cascading circuits of said first stage, each of said individual cascading circuits of said second stage including a two-input, two-wide AND-OR-INVERTER gate and a NAND gate; and
a third stage of at least one cascading circuit for connecting with each of two cascading circuits of said second stage, and third stage cascading circuit including a two-input, two-wide AND-OR-INVERTER gate and a NOR gate.

* * * * *